United States Patent [19]
Heinicke

[11] 4,333,140
[45] Jun. 1, 1982

[54] PULSE-CONTROLLED D-C CONVERTER WITH INDUCTIVE LOAD

[75] Inventor: Harald Heinicke, Erlangen, Fed. Rep. of Germany

[73] Assignee: Siemens Aktiengesellschaft, Munich, Fed. Rep. of Germany

[21] Appl. No.: 189,768

[22] Filed: Sep. 23, 1980

[30] Foreign Application Priority Data

Oct. 5, 1979 [DE] Fed. Rep. of Germany ....... 2940533

[51] Int. Cl.³ ............................................. H02M 3/315
[52] U.S. Cl. ..................................... 363/27; 363/124; 363/135
[58] Field of Search .................... 363/27, 28, 124, 135

[56] References Cited

U.S. PATENT DOCUMENTS 3,621,362 11/1971 Schwarz .................. 363/27
3,921,054 11/1975 Heinicke .................. 363/27 X
3,947,746 3/1976 Heinicke .................. 363/28

FOREIGN PATENT DOCUMENTS 2446576 4/1976 Fed. Rep. of Germany ........ 363/27

*Primary Examiner*—William M. Shoop
*Attorney, Agent, or Firm*—Kenyon & Kenyon

[57] ABSTRACT

A D-C voltage converter for controlling the voltage at an inductive load. The circuit is provided with a pulse transformer having first and second primary windings, a secondary winding, and a demagnetizing winding. The second primary winding receives a D-C voltage from a main D-C voltage supply by means of a controlled thyristor. The thyristor in combination with the first primary winding induce currents in the second primary winding and the secondary winding, which maintain a charge on a battery and which supply the inductive load. Electrical energy from the battery is used to produce a countervoltage for extinguishing a thyristor. In addition, circuitry is provided for extinguishing the conduction of the controlled thyristor.

4 Claims, 1 Drawing Figure

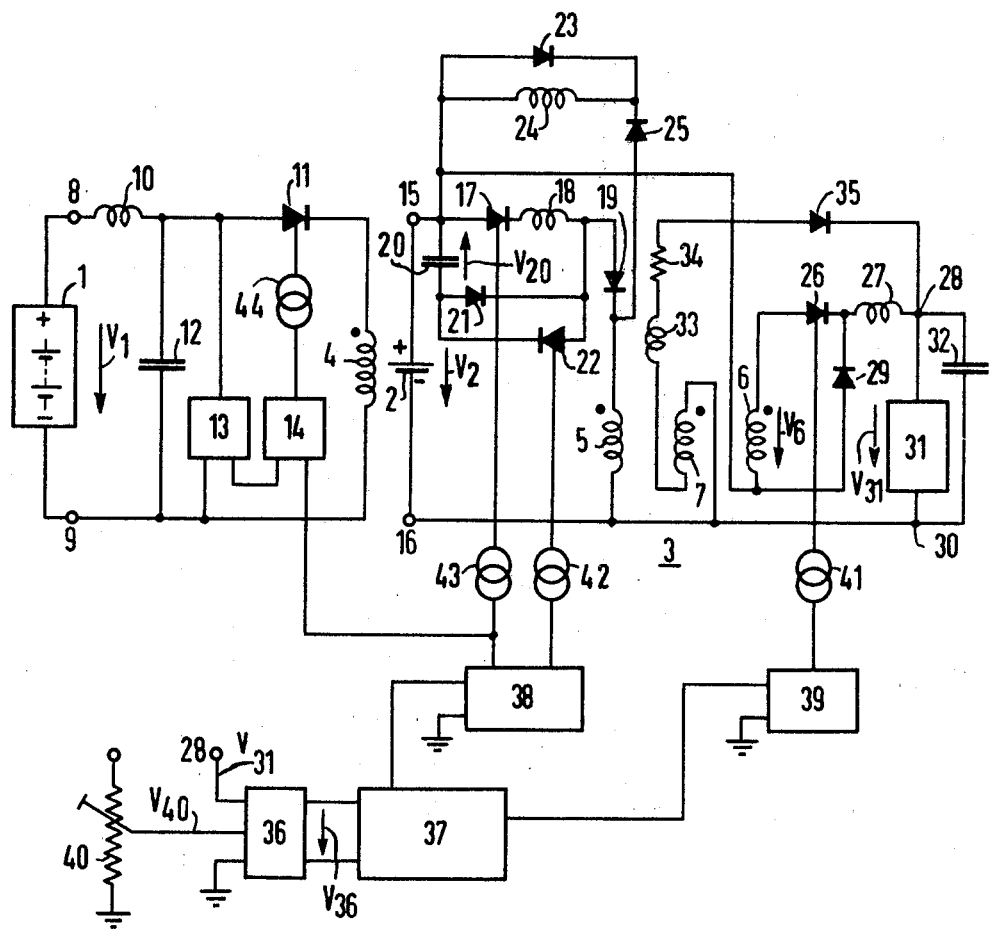

PULSE-CONTROLLED D-C CONVERTER WITH INDUCTIVE LOAD

BACKGROUND OF THE INVENTION

This invention relates to D-C voltage converters, and more particularly, to a pulse-controlled D-C converter which supplies an inductive load and which is provided with circuitry for charging a battery.

Known D-C converter circuits of the type which convert electrical energy from a battery into voltages suitable for an inductive load have heretofore suffered from the disadvantage of providing an output voltage to the inductive load which varies as a function of the charging state of the battery. Regulation circuits which have been applied to such converters so as to control the output voltage have produced undesirable distortions in the output waveform. Such distortions have been removed with the use of expensive harmonic filters.

It is, therefore, an object of this invention to control the output voltage of a D-C voltage converter so as to provide a constant voltage to an inductive load without the use of separate control devices or harmonic filters.

It is a further object of this invention to provide charging circuitry for charging the battery in the D-C converter circuit, thereby keeping the battery in reserve. Electrical energy for charging the battery and supplying the inductive load is provided by a main D-C voltage source.

SUMMARY OF THE INVENTION

The foregoing and other objects are achieved by this invention which provides a pulse controlled D-C converter circuit which is provided with a pulse transformer connected to a main D-C voltage source. Voltages induced in further windings, in response to the operation of a thyristor which is serially coupled with a primary winding of the pulse transformer, charge the battery and supply the inductive load.

In one embodiment of the invention, the thyristor which is coupled to the primary winding of the pulse transformer is extinguished by voltages induced across the primary winding in response to currents flowing through the secondary windings. The voltage at the inductive load is controlled by circuitry which produces pulses in response to a comparison between the load voltage and a reference value. Such pulses advantageously control the conductive states of controlled rectifiers which subsequently control the charging current to the battery and the load voltage.

BRIEF DESCRIPTION OF THE DRAWING

Comprehension of the invention is facilitated by reading the following detailed description in conjunction with the annexed drawing which shows, partly in schematic representation and partly in block and line form, a converter circuit which operates in accordance with the principles of the invention.

DETAILED DESCRIPTION

The FIGURE shows a single ended D-C voltage converter which contains a pulse transformer 3 having a first primary winding 5, a second primary winding 4, a secondary winding 6, and a demagnetizing winding 7. A main D-C voltage source 1 supplies a voltage $V_1$ across main input terminals 8 and 9. Second primary winding 4 is connected at one end to main input terminal 9, and at its other end, to main input terminal 8 by means of a thyristor 11 and a smoothing coil 10. A filter capacitor 12 is connected at one end to the electrical junction of smoothing coil 10 and thyristor 11, and at its other end to main input terminal 9. A pulse inhibitor 13 is connected in shunt across filter capacitor 12, and to a pulse amplifier 14 which is connected by a transformer 44 to the control terminal of thyristor 11.

A battery 2 supplies a voltage $V_2$ across terminals 15 and 16. Thyristor 17 is connected at its anode to terminal 15, and is further provided with a reversal choke 18 in series with its cathode. Reversal choke 18 is connected at its other end to terminal 16 by means of a diode 19 and first primary winding 5. Thyristor 17 and reversal choke 18 are connected in parallel with the series combination of a quenching capacitor 20 and the parallel combination of diode 21 and controlled rectifier 22. Diode 21 and controlled rectifier 22 are poled for conduction in opposite directions, with respect to each other. First primary winding 5 is connected to terminal 15 by means of diode 25 which is connected in series with the parallel combination of a bypass diode 23 and a smoothing coil 24.

Secondary winding 6 is connected at one end to terminal 15, and at its other end to the anode of controlled rectifier 26. Controlled rectifier 26 is connected at its cathode to an output terminal 28 by means of a smoothing coil 27. In addition, the series combination of secondary winding 6 and controlled rectifier 26 is shunted by a bypass diode 29. A load 31, which is shunted by a filter capacitor 32, is connected across output terminal 28 and a second output terminal 30 which is connected to terminal 16. Output terminals 30 and 28 are connected to one another by the series combination of demagnetizing winding 7 which has a stray inductance 33, a limiting resistor 34, and a diode 35.

Thyristors 11 and 17, and controlled rectifiers 22 and 26 are controlled by a control unit 37 which provides output signals in response to an output voltage $V_{36}$ of a controller 36. Control unit 37 is connected to control devices 38 and 39. Controller 36 receives at a first input the output voltage $V_{31}$ from terminal 28. A reference voltage $V_{40}$, which is advantageously adjustable by variable resistor 40 is conducted to a second input of controller 36. Control device 39 receives control pulses from control unit 37, and conducts them to the control terminal of controlled rectifier 26 by means of a transformer 41. Control device 38 receives control pulses from control unit 37 and conducts such firing information to controlled rectifier 22 by means of transformer 42. Similarly, control pulses are conducted by control device 38 to thyristor 17 by means of transformer 43, and to pulse amplifier 14. As indicated, pulse amplifier 14 conducts the firing pulses to thyristor 11 by means of transformer 44.

In operation, control unit 37 produces firing pulses in response to voltage signal $V_{36}$. For example, the firing pulses which are supplied to control device 39 so as to control the conduction state of controlled rectifier 26 are provided in response to the difference in amplitude between the load voltage $V_{31}$ and the battery voltage $V_2$. Battery voltage $V_2$ corresponds in amplitude to the charging condition of battery 2. In some embodiments, reference voltage $V_{40}$ may correspond in amplitude to $V_2$ by connecting the ungrounded terminal of variable resistor 40 to terminal 15. Firing pulses which are provided by control device 38 to pulse amplifier 14 for controlling the conduction state of thyristor 11 are inhibited by pulse inhibitor 13 if the amplitude of main D-C voltage $V_1$ is outside a permissible fluctuation range. As indicated, main D-C voltage supply 1 supplies electrical energy to the secondary circuitry between terminals 15 and 16, and 28 and 30 by thyristor 11 and second primary winding 4. The voltage which is induced in first primary winding 5 supplies a charging current to battery 2 by means of diode 25 and smoothing coil 24. Additionally, first primary winding 5 provides current to load 31 by means of bypass diode 29, and by means of secondary winding 6 during such times as controlled rectifier 26 is in a conductive state. Such load current is filtered by smoothing coil 27 and charges filter capacitor 32 to the load voltage $V_{31}$.

As previously indicated, expensive and complex circuitry in the form of diodes and high voltage capacitors are not required to extinguish thyristor 11 after each firing. First primary winding 5 and second primary winding 4 cooperate as a quenching transformer to place thyristor 11 in a non-conductive state. Such a quenching of thyristor 11 is effected by application of a higher negative cutoff voltage by firing of controlled rectifier 22 in a conductive state; thyristor 7 then being placed the quenching circuit of thyristor 17, while thyristor 17 is in a conductive state. This causes a reversal of the charge of capacitor 20, and on completion of the voltage reversal, thyristor 17 is rendered non-conductive by operation of diode 21. The polarity-reversed voltage $V_{20}$ at capacitor 20 is therefore added to battery voltage $V_2$ to produce an increased voltage which causes a current to flow through diodes 21 and 19, and into first primary winding 5 during the recovery time on the primary windings 4 and 5. This causes a counter voltage to be induced across second primary winding 4, and a voltage across first primary winding 5 which opposes current flow through thyristor 17. In this manner, thyristors 11 and 17 are quenched.

Should main D-C voltage supply 1 fail temporarily, the charged battery 2 supplies load 31 by turning on thyristor 17. Load current also flows to load 31 from terminal 15, secondary winding 6, controlled rectifier 26, and smoothing coil 27. Simultaneously, a smaller current, the magnitude of which depends upon the transformation ratio of windings 5 and 6, flows in first primary winding 5, on which a magnetizing current is superimposed. When thyristors 11 and 17 are cutoff, any remaining magnetizing current flowing through the demagnetizing winding 7 is blocked by the output voltage $V_{31}$.

Although the inventive concept described herein is disclosed in terms of specific applications and embodiments, it is to be understood that persons skilled in the art can make additional embodiments for additional applications without departing from the scope of the invention. The drawings and descriptions herein are merely descriptive and should not be construed as limitations.

What is claimed is:

1. A D-C voltage converter circuit for controlling a voltage at an output terminal for connecting an inductive load, the circuit being of the type which is provided with battery terminals for connecting a battery, a first thyristor for controlling electrical conduction from the battery terminals to a first primary winding of a pulse transformer, the pulse transformer having a secondary winding for supplying electrical energy to the output terminal, the battery responsively supplying an increased cutoff voltage for extinguishing the first thyristor, CHARACTERIZED IN THAT the pulse transformer is further provided with a second primary winding connected to an input terminal for receiving a main D-C voltage, conduction between said input terminal and said second primary winding being controllable by a second thyristor so as to cause the first primary winding and the secondary winding to produce currents for charging the battery and supplying the inductive load.

2. The converter circuit of claim 1 wherein there is further provided;
   first control means for producing a first control signal responsive to a voltage at the output terminal;
   second control means connected to said first control means for receiving said first control signal and having first and second output terminals for producing second and third control signals, respectively;
   first control device means connected to said first output terminal of said second control means for controlling a first controlled rectifier in response to said second control signals;
   second control device means connected to said second output terminal of said second control means for controlling the conductive states of the first and second thyristors in response to said third control signals; and
   pulse amplifier means electrically disposed between said second control device means and the second thyristor for inhibiting the control of the second thyristor by said second control device means in response to a pulse inhibitor.

3. The converter circuit of claim 2 wherein there is further provided a second control rectifier controlled by said second control device means for providing a signal for quenching said first thyristor.

4. The converter circuit of claim 1 wherein said first primary winding charges the battery by a circuit comprising a diode in series with a parallel combination of a smoothing coil and a bypass diode.

* * * * *